(12) United States Patent
Sato et al.

(10) Patent No.: US 11,204,244 B2
(45) Date of Patent: Dec. 21, 2021

(54) SENSOR UNIT AND STRUCTURAL HEALTH MONITORING

(71) Applicant: Seiko Epson Corporation, Tokyo (JP)

(72) Inventors: Kenta Sato, Shiojiri (JP); Yasushi Yoshikawa, Chino (JP)

(73) Assignee: Seiko Epson Corporation

( * ) Notice: Subject to any disclaimer, the term of this patent is extended or adjusted under 35 U.S.C. 154(b) by 363 days.

(21) Appl. No.: 16/381,120

(22) Filed: Apr. 11, 2019

(65) Prior Publication Data
US 2019/0316903 A1 Oct. 17, 2019

(30) Foreign Application Priority Data

Apr. 12, 2018 (JP) .............................. JP2018-076647

(51) Int. Cl.
*G01C 9/06* (2006.01)
*G01K 7/22* (2006.01)

(52) U.S. Cl.
CPC ................ *G01C 9/06* (2013.01); *G01K 7/22* (2013.01)

(58) Field of Classification Search
None
See application file for complete search history.

(56) References Cited

U.S. PATENT DOCUMENTS

| | | | | |
|---|---|---|---|---|
| 3,273,248 A * | 9/1966 | Halverstadt | ............... | G01B 3/20 33/702 |
| 3,334,419 A * | 8/1967 | William | ................. | G01B 5/061 33/702 |
| 4,100,837 A * | 7/1978 | Kohler | ............... | B23Q 11/0003 33/702 |
| 5,189,807 A * | 3/1993 | Gustafsson | .......... | G01B 5/0014 33/702 |
| 5,581,033 A * | 12/1996 | Hess | ........................ | F16M 1/00 73/431 |
| 5,952,572 A * | 9/1999 | Yamashita | ............. | G01C 19/56 73/504.04 |
| 6,662,462 B2 * | 12/2003 | Ruijl | ........................ | G01B 5/00 33/503 |
| 6,844,720 B1 * | 1/2005 | Pokrywka | .............. | G01D 18/00 324/202 |
| 6,885,300 B1 * | 4/2005 | Johnston | ............ | G08B 13/1618 340/541 |
| 8,001,700 B2 * | 8/2011 | Tondorf | ............. | G01D 5/34715 33/706 |

(Continued)

FOREIGN PATENT DOCUMENTS

| | | | |
|---|---|---|---|
| JP | 2014-085233 A | | 5/2014 |
| JP | 2015-034755 A | | 2/2015 |

(Continued)

*Primary Examiner* — Christopher W Fulton
(74) *Attorney, Agent, or Firm* — Harness, Dickey & Pierce, P.L.C.

(57) ABSTRACT

A sensor unit includes acceleration sensors as physical quantity sensors, a control IC as a processor electrically coupled to the acceleration sensors, a circuit board as a board on which the acceleration sensors and the control IC are installed, and a container accommodating the circuit board. The acceleration sensors and the control IC are disposed on the circuit board such that the acceleration sensors and the control IC do not overlap each other in a plan view.

8 Claims, 11 Drawing Sheets

(56) References Cited

U.S. PATENT DOCUMENTS

| | | | | |
|---|---|---|---|---|
| 8,919,005 | B2* | 12/2014 | Mamour | G01B 5/0014 |
| | | | | 33/503 |
| 2005/0217370 | A1* | 10/2005 | Takahashi | G01N 33/0009 |
| | | | | 73/431 |
| 2006/0053645 | A1* | 3/2006 | Rock | G01C 1/00 |
| | | | | 33/366.11 |
| 2012/0266672 | A1* | 10/2012 | Meinel | G01P 15/008 |
| | | | | 73/514.16 |
| 2013/0263661 | A1* | 10/2013 | Watanabe | G01P 15/09 |
| | | | | 73/504.12 |
| 2015/0040666 | A1 | 2/2015 | Saito et al. | |
| 2016/0249174 | A1* | 8/2016 | Patel | G01K 13/20 |
| 2017/0191832 | A1 | 7/2017 | Kinoshita et al. | |
| 2019/0257652 | A1* | 8/2019 | Eta | G05D 1/0808 |
| 2019/0277876 | A1* | 9/2019 | Sato | G01P 15/18 |
| 2019/0353506 | A1* | 11/2019 | Yoda | G01D 11/245 |
| 2019/0369137 | A1* | 12/2019 | Naruse | G05D 1/0088 |
| 2020/0271535 | A1* | 8/2020 | Sato | G01L 27/007 |
| 2021/0092846 | A1* | 3/2021 | Kieslinger | H05K 1/0201 |

FOREIGN PATENT DOCUMENTS

| | | |
|---|---|---|
| JP | 2016-023931 A | 2/2016 |
| JP | 2017-015584 A | 1/2017 |

* cited by examiner

SENSOR UNIT AND STRUCTURAL HEALTH MONITORING

The present application is based on and claims priority from JP Application Serial Number 2018-076647, filed Apr. 12, 2018, the disclosure of which is hereby incorporated by reference herein in its entirety.

BACKGROUND

1. Technical Field

The present disclosure relates to a sensor unit and a structural health monitoring.

2. Related Art

In the related art, a sensor unit that is provided with an inertial sensor such as an acceleration sensor or an angular velocity sensor as a physical quantity sensor has been known. The sensor unit can function as a motion sensor unit and examples thereof include an inclination sensor unit (inclinometer) which is installed on a structure such as a building and a highway, an inclined surface of a mountain, a retaining wall surface of an embankment, or the like and an inertial measurement unit (IMU) which measures the posture or the behavior (inertia momentum) of a moving object (mounting target device) such as an agricultural machine, a construction machine, an automobile, a drone, and a robot.

As such a sensor unit, for example, a sensor unit that functions as a so-called six-axis motion sensor provided with an acceleration sensor for three axes and an angular velocity sensor for three axes is described in JP-A-2016-23931. Each sensor is electrically coupled to an arithmetic processing circuit, that is, a microprocessor unit (MPU) as a control IC installed on a rear surface side of a circuit board and is controlled by the MPU. The MPU performs arithmetic processing based on a detection signal output from each sensor and outputs a detection value.

However, in the case of the sensor unit disclosed in JP-A-2016-23931, there is a problem that heat generated due to heat generated in the MPU is transmitted to each sensor and a detection signal output from each sensor fluctuates due to the heat, which results in a decrease in detection accuracy.

SUMMARY

A sensor unit according to an aspect the present application includes a board, a physical quantity sensor installed on the board, a processor installed on the board not to overlap the physical quantity sensor in a plan view while being electrically coupled to the physical quantity sensor, a thermosensitive element installed on the board, and a container accommodating the board. The board is provided with a first region in which the processor is installed and a second region in which the physical quantity sensor is installed.

In the sensor unit, the thermosensitive element may be installed in the second region.

In the sensor unit, the thermosensitive element may be installed on a surface in the second region on which the physical quantity sensor is installed.

In the sensor unit, the board may be provided with a coupling region that is disposed between the first region and the second region and has a third sectional area that is smaller than a first sectional area of the first region and a second sectional area of the second region in a sectional view as seen in a direction in which the first region and the second region are arranged.

In the sensor unit, the coupling region may be a constriction portion at which an outer edge of the board extending in a first direction, in which the first region and the second region are arranged, is constricted, as seen in a plan view.

In the sensor unit, the constriction portion may be provided on each of opposite sides of the board in a second direction orthogonal to the first direction, as seen in a plan view.

The sensor unit may further include a connecter installed in the first region of the board.

In the sensor unit, the thermosensitive element may be a thermistor or a diode.

In the sensor unit, the physical quantity sensor may measure at least any of acceleration and angular velocity.

A structure health monitoring device according to an aspect of the present application includes the above-described sensor unit, a receiver receiving a detection signal from the sensor unit attached to a structure, and a calculator calculating an inclination angle of the structure based on a signal output from the receiver.

DESCRIPTION OF EXEMPLARY EMBODIMENTS

Hereinafter, an embodiment will be described. Note that, the embodiment described below does not unduly limit the scope of the present disclosure as stated in the appended claims. In addition, all of the elements described in the embodiment should not necessarily be taken as essential elements of the present disclosure.

Sensor Unit

First Embodiment

First, a sensor unit 100 according to a first embodiment of the present disclosure will be described with reference to FIGS. 1 and 2.

Figure 1:
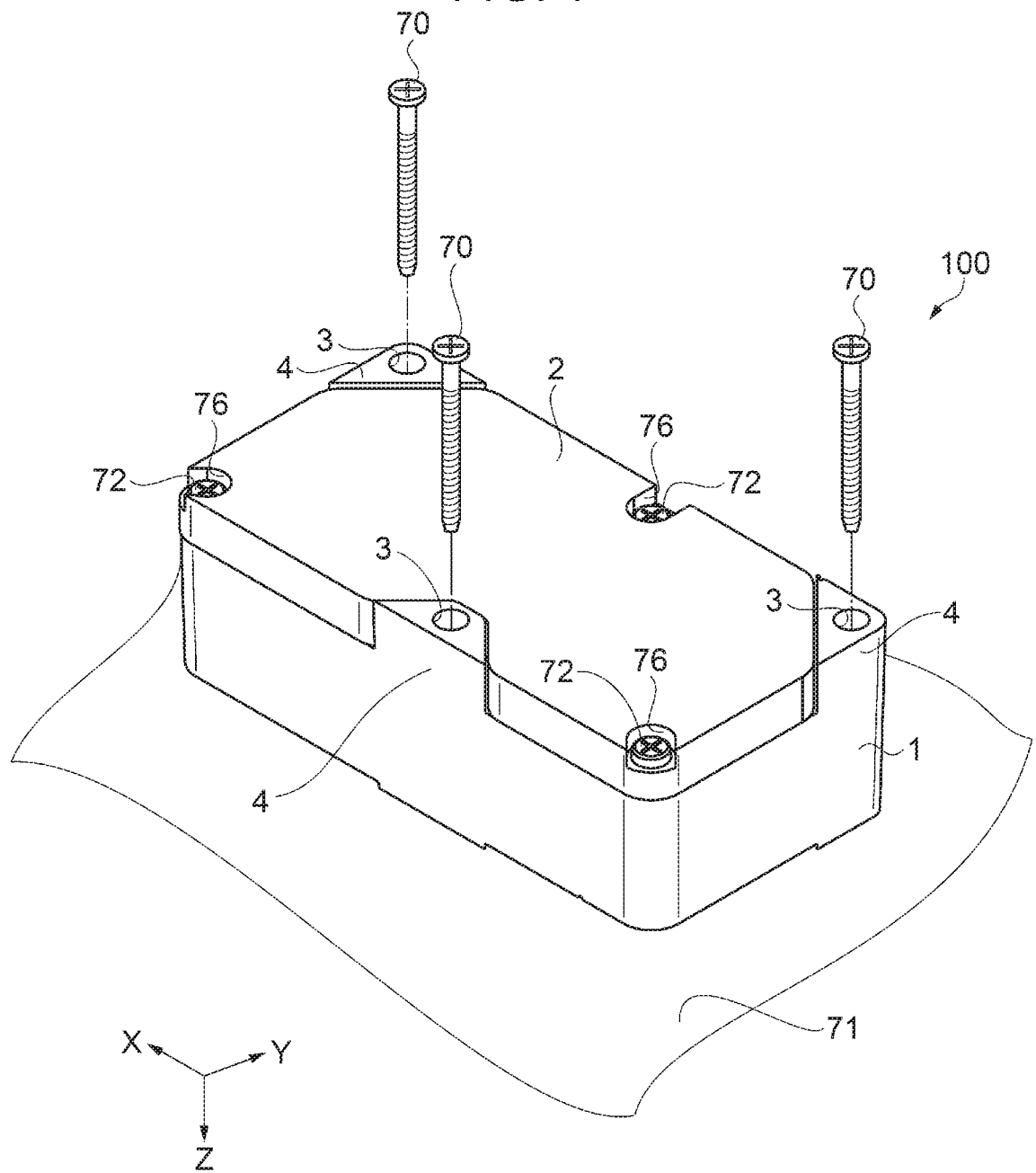
FIG. 1 is a perspective view illustrating a state where a sensor unit according to a first embodiment of the present disclosure is fixed to a mounting target surface.

FIG. 1 is a perspective view illustrating a state where a sensor unit according to the first embodiment of the present disclosure is fixed to a mounting target surface. FIG. 2 is a perspective view illustrating the outline of the sensor unit as seen from the mounting target surface side of FIG. 1.

As illustrated in FIG. 1, the sensor unit 100 is an inertial measurement unit which measures the posture or the behavior (inertia momentum) of a moving object (mounting target device) such as an automobile, an agricultural machine, a construction machine, a robot, and a drone. The sensor unit 100 functions as a so-called three-axis motion sensor which is provided with three acceleration sensors as physical quantity sensors, each of the three acceleration sensors measuring acceleration along one axis.

The sensor unit 100 has a rectangular parallelepiped shape of which the planar shape is rectangular. The length of a longer side of the sensor unit 100 in a first direction (X axis direction) is approximately 50 mm, the length of a shorter side of the sensor unit 100 in a second direction (Y axis direction) orthogonal to the first direction is approximately 24 mm, and the thickness of the sensor unit 100 is approximately 16 mm. Fixation projections 4 are provided at two positions near the opposite end portions of one longer side of the sensor unit 100 and one position on the central portion of the other longer side and a screw hole 3 is formed in each of the fixation projections 4. Fixation screws 70 are respectively inserted into the three screw holes 3 and the sensor unit 100 is used in a state of being fixed to a mounting target surface 71 of a structure (device) as a bonding target portion such as a bridge or a notice board, for example. Note that, the above-described size related to the sensor unit 100 is merely an example and the size of the sensor unit 100 can be reduced to such a size that the sensor unit 100 can be installed in a head-mounted display (HMD) (smart glasses), a smart phone, or a digital camera through selection of components or a change in design. Note that, an opening of the sensor unit 100 which is on a side opposite to the mounting target surface 71 is covered with a lid 2 which is disposed being guided by the fixation projections 4. Note that, the lid 2 is fixed to a container 1 via a sealing member 41 (refer to FIG. 3) with screws 72 inserted into three through-holes 76 including recesses (dredged portions).

Figure 2:
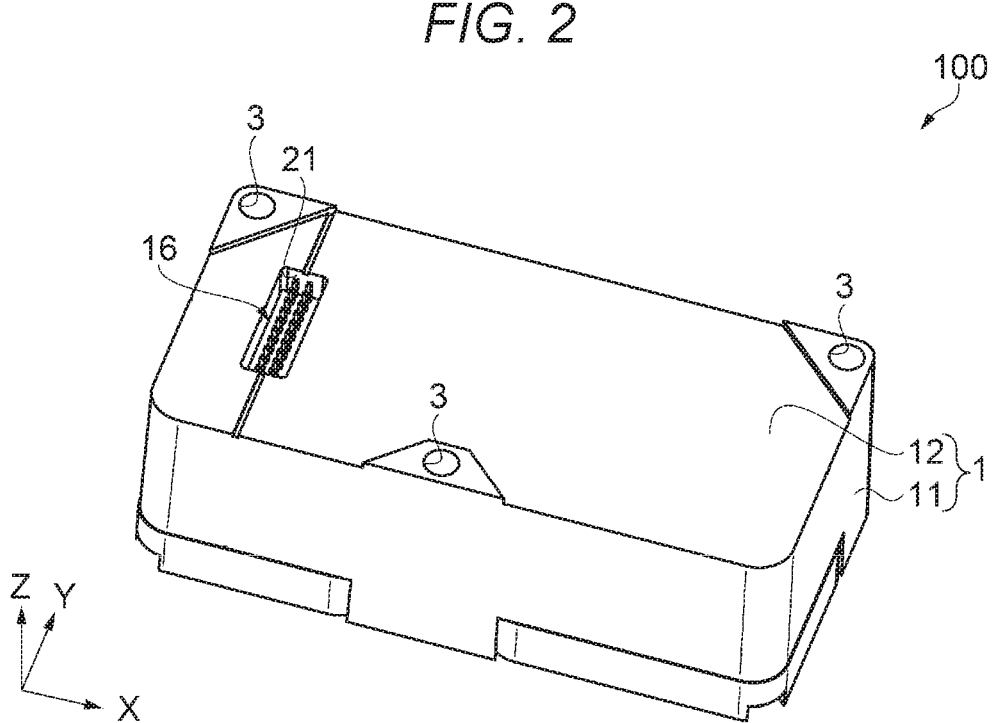
FIG. 2 is a perspective view illustrating an outline of the sensor unit as seen from the mounting target surface side of FIG. 1.

As illustrated in FIG. 2, a surface of the sensor unit 100 that is on the mounting target surface side is provided with an opening 21. In the opening 21, a plug-type (male) connecter 16 is disposed. The connecter 16 is provided with a plurality of pins arranged in two rows and the plurality of pins are arranged in the second direction (Y axis direction) in each row. A socket-type (female) connecter (not shown) from a mounting target device is coupled to the plug-type (male) connecter 16 and a drive voltage for the sensor unit 100 or electric signals of detection data or the like is transmitted and received therebetween. Note that, the plug-type (male) connecter 16 is attached to a circuit board 15 (refer to FIG. 5) as a board, which will be described later.

The configuration of the sensor unit 100 in the present embodiment is not limited to a three-axis motion sensor and can be applied to any unit or device provided with a physical quantity sensor (inertial sensor).

Note that, in the following description, a direction parallel to a longer side of the sensor unit 100, which is rectangular in a plan view, will be referred to as the first direction (X axis direction). In addition, a direction (direction parallel to shorter side) orthogonal to the first direction (X axis direction) in a plan view will be referred to as the second direction (Y axis direction). In addition, the thickness direction of the sensor unit 100 will be referred to as a third direction (Z axis direction).

Configuration of Sensor Unit

Next, a configuration of the sensor unit 100 will be described with reference to FIGS. 3, 4, 5, 6, and 7 in addition to FIGS. 1 and 2.

Figure 3:
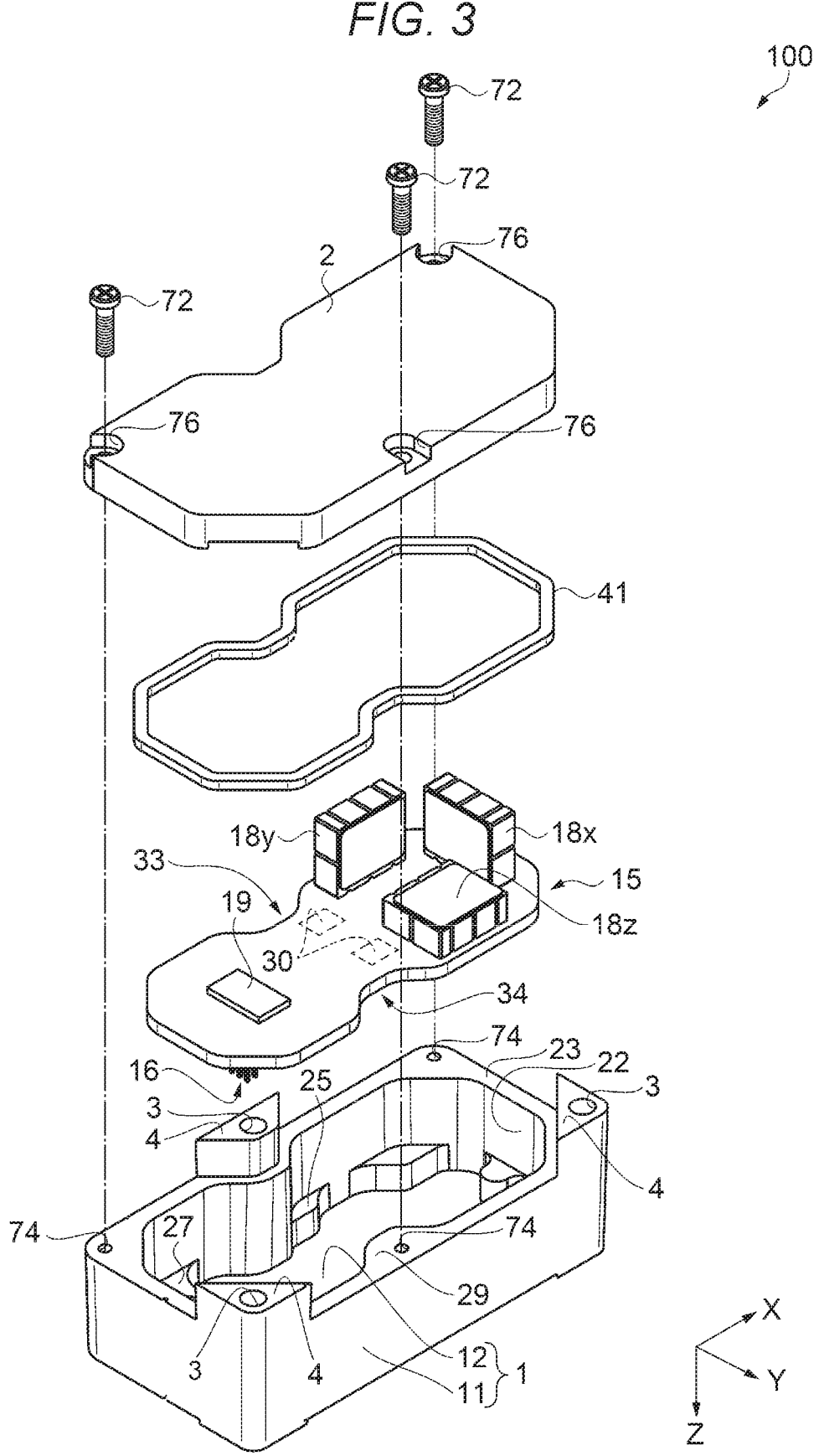
FIG. 3 is an exploded perspective view of the sensor unit in the same state as in FIG. 1.
Figure 4:
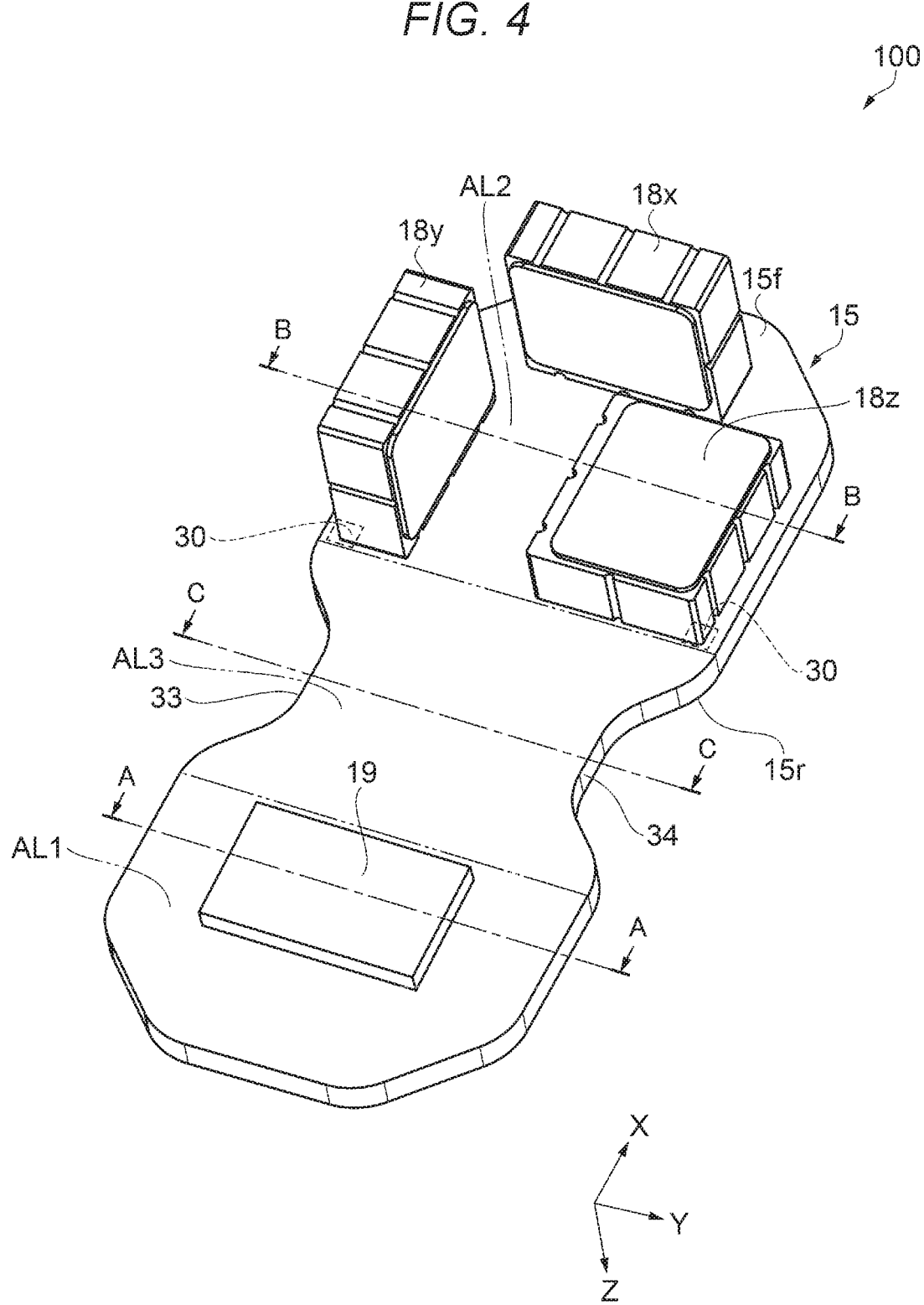
FIG. 4 is an external appearance perspective view illustrating a schematic configuration of a board (circuit board) as seen in the same direction as in FIG. 3.
Figure 5:
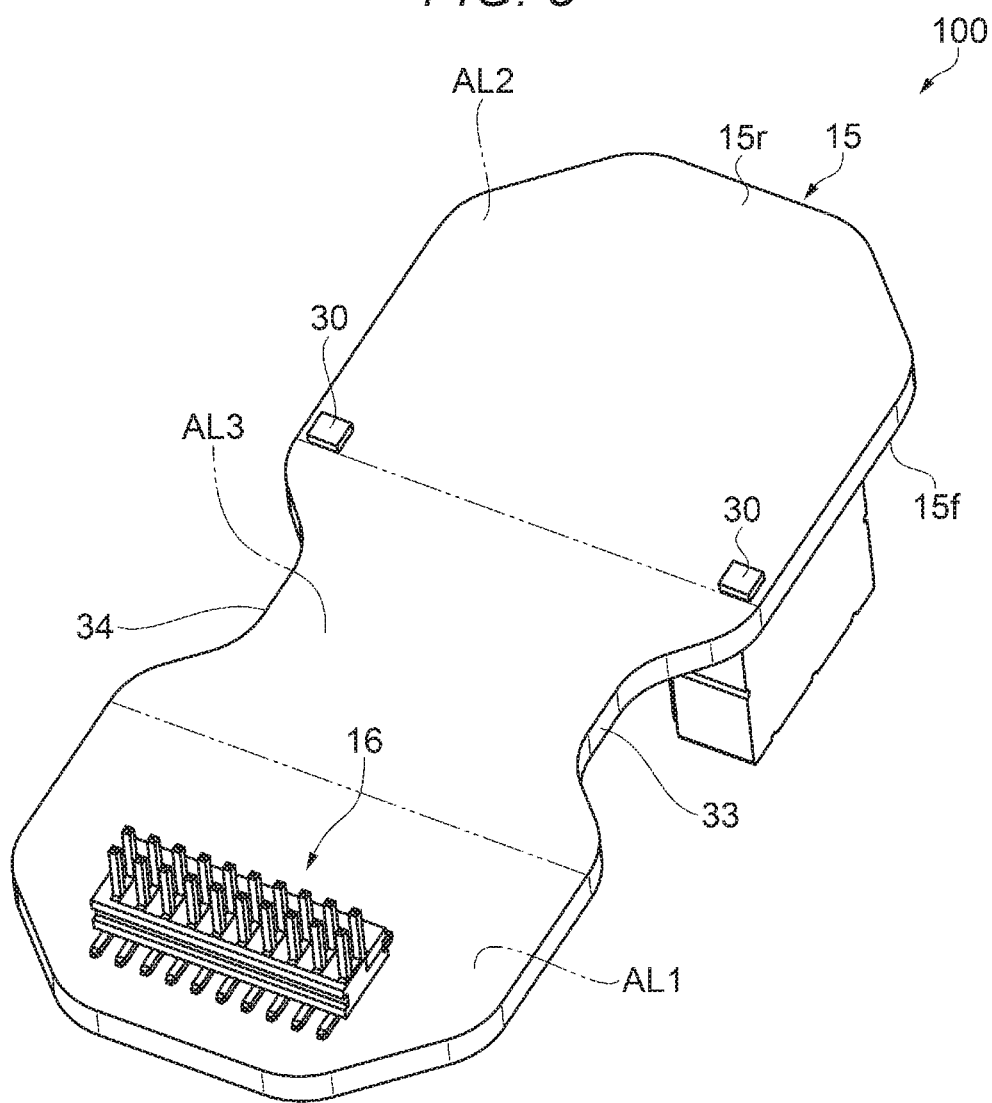
FIG. 5 is an external appearance perspective view illustrating a schematic configuration of the board (circuit board) as seen in a direction opposite to that in FIG. 4.
Figure 5:
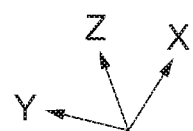
Figure 6:
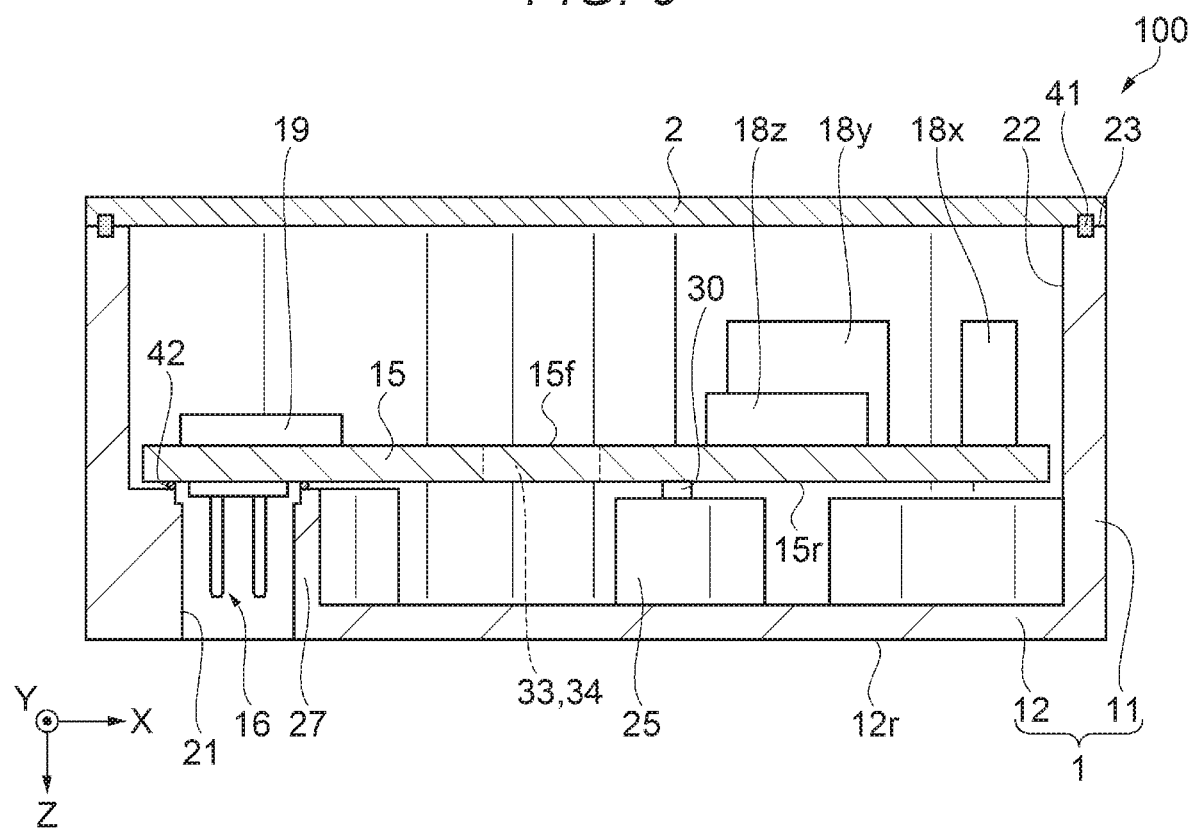
FIG. 6 is a sectional view illustrating an outline of the sensor unit.
Figure 7:
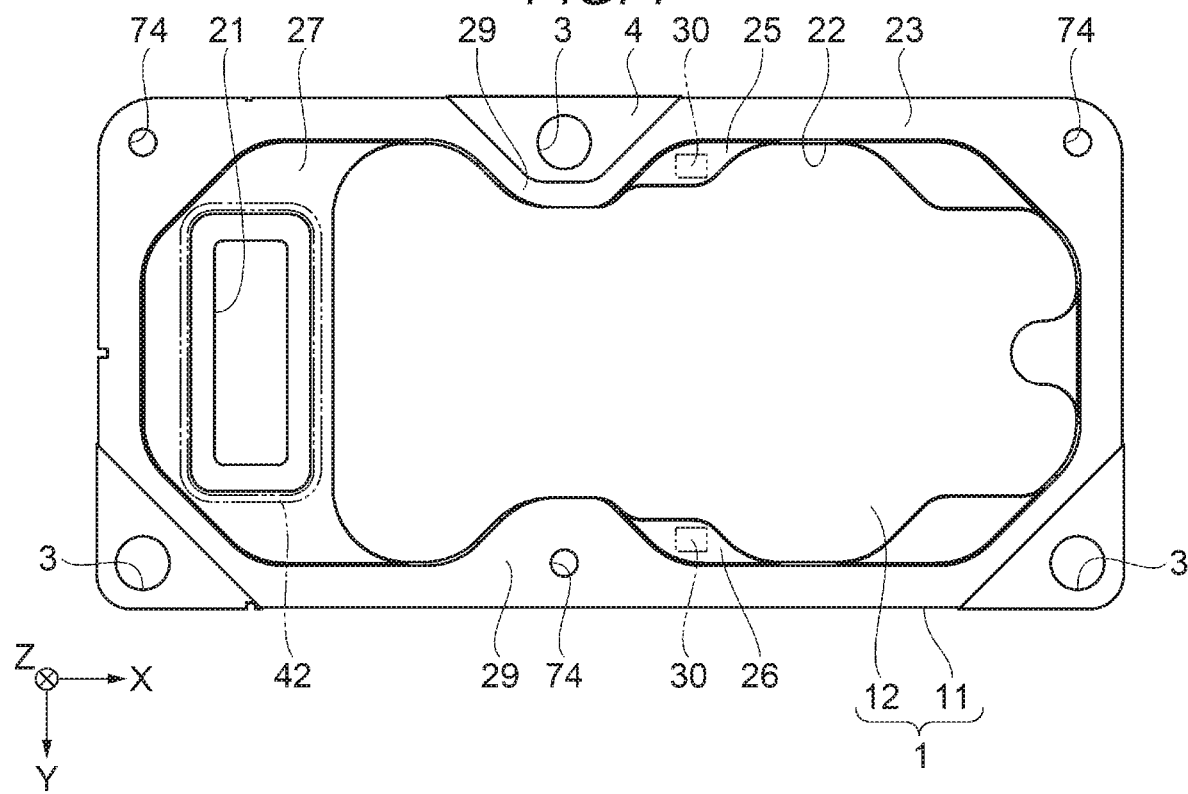
FIG. 7 is a plan view illustrating an outline of the container.

FIG. 3 is an exploded perspective view of the sensor unit in the same state as in FIG. 1. FIG. 4 is an external appearance perspective view illustrating a schematic configuration of the board (circuit board) as seen in the same direction as in FIG. 3. FIG. 5 is an external appearance perspective view illustrating a schematic configuration of the board (circuit board) as seen in a direction opposite to that in FIG. 4. FIG. 6 is a sectional view illustrating an outline of the sensor unit. FIG. 7 is a plan view illustrating an outline of the container.

As illustrated in FIG. 3, the sensor unit 100 is configured of the container 1, the lid 2, the sealing member 41, the circuit board 15 as a board, or the like. More specifically, the sensor unit 100 is configured such that the circuit board 15 is attached into the container 1 with fixation members 30 and 42 (refer to FIGS. 6 and 7) interposed therebetween and the opening of the container 1 is covered with the lid 2 via the sealing member 41.

The container 1 is molded into a box shape having an internal space by using, for example, aluminum and is a member as a container accommodating the circuit board 15. The container 1 can be formed by cutting aluminum or can be formed through die casting (metal mold casting). Note that, the material of the container 1 is not limited to aluminum and other metals such as zinc and stainless steel, resin, a composite material of metal and resin, or the like may also be used. The outer shape of the container 1 is a rectangular parallelepiped shape of which the planar shape is approximately rectangular as with the entire shape of the sensor unit 100 and the fixation projections 4 are provided at two positions near the opposite end portions of one longer side of the container 1 and one position on the central portion of the other longer side and the screw hole 3 is formed in each of the fixation projections 4. Here, each of the fixation projections 4 that are provided at two positions near the opposite end portions of the one longer side includes an intersection portion between a shorter side and a longer side and is approximately triangular as seen in a plan view. In addition, the fixation projection 4 that is provided at the one position on the central portion of the other longer side has an approximately trapezoidal shape that faces the internal space of the container 1 in a plan view.

Note that, structures related to fixation of the container 1 are not limited to the screw holes 3. For example, a configuration in which a cutout that can be fastened with a screw is formed (structure where cutouts are formed in fixation projections 4 on corner portions of the container 1 in which screw holes 3 are disposed or fixation projection 4 on central portion in which screw hole 3 is disposed) and the cutout is fastened with the screw or a configuration in which a flange (ear) is formed on a side surface of the container 1 and the flange is fastened with a screw may also be adopted. However, in the case of the former configuration in which a cutout hole is fastened with the screw as a fixation portion, when the cutout of the cutout hole is wider than the diameter of the head of the screw, the screw may be inclined with the head thereof deviating from the cutout when the cutout is fastened with the screw and there is a possibility that the cutout fastened with the screw becomes likely to be released or a cutout hole portion of an outer case is deformed or scraped due to the deviation of the screw. Therefore, when providing a cutout hole as a fixation portion, it is preferable that a cutout of the cutout hole is narrower than the diameter of the head of a screw constituting a seat surface.

The outer shape of the container 1 is a rectangular parallelepiped shape and a box shape open to one side. The inside of the container 1 is the internal space (accommodation space) surrounded by a bottom wall 12 and side walls 11. In other words, the container 1 has a box shape of which one surface facing the bottom wall 12 is an opening surface 23, an outer edge of the circuit board 15 is disposed (accommodated) along inner surfaces 22 of the side walls 11, and the lid 2 is fixed to cover the opening. Here, the opening surface 23 facing the bottom wall 12 is a surface on which the lid 2 is mounted. On the opening surface 23, the fixation projections 4 are erected at two positions near the opposite end portions of one longer side of the container 1 and one position on the central portion of the other longer side. In addition, upper surfaces (surfaces exposed in –Z direction) of the fixation projections 4 are the same surfaces as an upper surface of the container 1.

In addition, as illustrated in FIGS. 6 and 7, in the internal space (accommodation space) of the container 1, a projection 29 that protrudes from the side wall 11 to the internal space side over an area from the bottom wall 12 to the opening surface 23 is provided near a central portion of the one longer side which faces the fixation projection 4 provided on the central portion of the other longer side. In an upper surface (same surface as opening surface 23) of the projection 29, a female screw 74 for fixation of the lid 2 is provided. Here, the fixation projection 4 provided on the central portion of the other longer side may protrude from the side wall 11 to the internal space side over an area from the bottom wall 12 to the opening surface 23, as with the projection 29. Note that, the projection 29 and the fixation projection 4 are provided to face constriction portions 33 and 34 (refer to FIG. 4) of the circuit board 15, which will be described later.

In addition, in the internal space (accommodation space) of the container 1, a first pedestal 27 and second pedestals 25 and 26 that protrude from the bottom wall 12 to the opening surface 23 side to form step-like shapes higher than the bottom wall 12 are provided. As illustrated in FIGS. 6 and 7, the first pedestal 27 is provided to face a disposition region for the plug-type (male) connecter 16 attached to the circuit board 15 and is provided with the opening 21 into which the plug-type (male) connecter 16 is inserted. The first pedestal 27 functions as a pedestal for fixing the circuit board 15 to the container 1 by means of the fixation member 42 disposed in the vicinity of the plug-type (male) connecter 16. Note that, the opening 21 penetrates a surface inside the first pedestal 27 and a lower surface 12r, which is an outer surface of the container 1. That is, the opening 21 penetrates the inside and the outside of the container 1.

The second pedestals 25 and 26 are positioned opposite to the first pedestal 27 with respect to the fixation projection 4 positioned on the central portion of the longer side and the projection 29 and are provided near the fixation projection 4 and the projection 29. Note that, the second pedestals 25 and 26 may be connected to any of the fixation projection 4 and the projection 29. The second pedestals 25 and 26 function as pedestal for fixing the circuit board 15 to the container 1 on a side opposite to the first pedestal 27 with respect to the fixation projection 4 and the projection 29.

Note that, an example in which the outer shape of the container 1 is a rectangular parallelepiped shape of which the planar shape is approximately rectangular and is a box-like shape without a lid has been described above. However, the present disclosure is not limited thereto and the planar shape of the outer shape of the container 1 may be square. Alternatively, the planar shape may be a polygonal shape such as a hexagonal shape or an octagonal shape, a corner of a vertex of the polygonal shape may be chamfered, and may be a planar shape of which each side is a curved line. In addition, the planar shape of the inside of the container 1 is not limited to the shape described above and may be another shape. In addition, the outer shape of the container 1 and the planar shape of the inside of the container 1 may be similar to each other or not.

The circuit board 15 as the board is a multilayer board in which a plurality of through-holes or the like are formed and a glass epoxy board is used as the circuit board 15. Note that, the circuit board 15 is not limited to a glass epoxy board and may be any rigid board as long as a plurality of physical quantity sensors, an electric component, a connecter, or the like can be installed thereon. For example, a composite board or a ceramic board may also be used.

As illustrated in FIGS. 4 and 5, the circuit board 15 is provided with a second surface 15r on the bottom wall 12 side and a first surface 15f opposite to the second surface 15r. The circuit board 15 can be divided into a first region AL1 in which a control IC 19 as a processor and the plug-type (male) connecter 16 are installed, a second region AL2 in which acceleration sensors 18x, 18y, and 18z as physical quantity sensors are installed, and a coupling region AL3 positioned between the first region AL1 and the second region AL2. Therefore, the control IC 19 and the acceleration sensors 18x, 18y, and 18z are disposed not to overlap each other in a plan view. Note that, the circuit board 15 is provided with various wires and terminal electrodes (not shown) but description thereof will be omitted.

As illustrated in FIG. 4, the control IC 19 is installed on the first surface 15f in the first region AL1 of the circuit board 15 and the three acceleration sensors 18x, 18y, and 18z are installed on the first surface 15f in the second region AL2. In addition, as illustrated in FIG. 5, the plug-type (male) connecter 16 is installed on the second surface 15r in the first region AL1 of the circuit board 15. Therefore, the first surface 15f is a surface of the circuit board 15 that is on a side on which the control IC 19 and the acceleration sensors 18x, 18y, and 18z are installed.

A central portion of the circuit board 15 in the first direction (X axis direction) is provided with constriction portions 33 and 34 at which the outer edge of the circuit board 15 is constricted in a plan view, the first direction being a direction along the longer side of the container 1. The constriction portions 33 and 34 are provided on opposite sides of the circuit board 15 in the second direction (Y axis direction) orthogonal to the first direction, are constricted in a direction from the outer edge of the circuit board 15 to the center in a plan view, and are provided to face the projection 29 and the fixation projection 4 (refer to FIG. 3) of the container 1. In addition, a region in which the constriction portions 33 and 34 are provided is the coupling region AL3.

Therefore, the coupling region AL3 is provided to have a third sectional area (sectional area of section C-C in FIG. 4) that is smaller than a first sectional area of a section A-A of the first region AL1 in FIG. 4 and a second sectional area of a section B-B of the second region AL2 in FIG. 4 as seen in the first direction (X axis direction) in which the first region AL1 and the second region AL2 are arranged, the sections being sections parallel to the second direction (Y axis direction) orthogonal to the first direction. In other words, the coupling region AL3 can be a region in the constriction portions 33 and 34 of the circuit board 15 from a position on the first region AU side at which the outer edge starts to be constricted to a position on the second region AL2 side at which the outer edge starts to be constricted (region between two two-dot chain lines in FIG. 5).

As described above, the control IC 19 and the acceleration sensors 18x, 18y, and 18z do not overlap each other, the control IC 19 is installed in the first region AL1 of the circuit board 15, and the acceleration sensors 18x, 18y, and 18z are installed in the second region AL2. Therefore, the acceleration sensors 18x, 18y, and 18z can be separated from the control IC 19 which generates heat such that heat generated in the control IC 19 becomes less likely to be transmitted to the acceleration sensors 18x, 18y, and 18z. Therefore, it is possible to suppress a decrease in detection accuracy of the sensor unit 100 which occurs when the heat generated in the control IC 19 is transmitted to the acceleration sensors 18x, 18y, and 18z.

The circuit board 15 is inserted into the internal space of the container 1 with the second surface 15r facing the first pedestal 27 and the second pedestals 25 and 26. In addition, the circuit board 15 is attached to the container 1 by means of the fixation member 42 that is disposed on the first pedestal 27 and is disposed in a ring shape in the vicinity of the attached plug-type (male) connecter 16 and the fixation members 30 that are disposed on the second pedestals 25 and 26. That is, the circuit board 15 is attached to the first pedestal 27 and the second pedestals 25 and 26 of the container 1 via the fixation members 42 and 30 in the vicinity of the plug-type (male) connecter 16 in the first region AL1 and a region in the second region AL2 that is on the coupling region AL3 side.

Since the fixation member 42 is disposed in a ring shape in the vicinity of the connecter 16, airtightness between the container 1 and the circuit board 15 can be secured in the vicinity of the connecter 16. Therefore, a foreign matter such as dust from the vicinity of the connecter 16 exposed to the outside can be prevented from intruding into the container 1.

The plug-type (male) connecter 16 is provided with coupling terminals which are arranged at regular pitches in the Y axis direction and are arranged in two rows in the X axis direction. Preferably, ten pins constitute one row and the number of the coupling terminals is twenty in total. However, the number of the coupling terminals may be appropriately changed according to the design and specification.

Each of the acceleration sensors 18x, 18y, and 18z as physical quantity sensors can measure acceleration in one axis direction. As each of the acceleration sensors 18x, 18y, and 18z, preferably, a vibration type acceleration sensor in which a crystal is used as a vibrator and which measures acceleration based on a resonant frequency changed by a force applied to the vibrator is used. Note that, the acceleration sensors 18x, 18y, and 18z will be described later.

The acceleration sensor 18x is erected with a side surface thereof facing the first surface 15f of the circuit board 15 such that front and rear surfaces of a package face the X axis direction and the acceleration sensor 18x measures acceleration applied in the X axis direction. The acceleration sensor 18y is erected with a side surface thereof facing the first surface 15f of the circuit board 15 such that front and rear surfaces of a package face the Y axis direction and the acceleration sensor 18y measures acceleration applied in the Y axis direction. The acceleration sensor 18z is coupled such that front and rear surfaces of a package face the Z axis direction, that is, the front and rear surfaces face the first surface 15f of the circuit board 15 and the acceleration sensor 18z measures acceleration applied in the Z axis direction.

Note that, the acceleration sensors 18x, 18y, and 18z are not limited to a vibration type acceleration sensor which use a crystal and may be any type of sensor as long as acceleration can be measured. The other sensors may be, for example, a capacitance type acceleration sensor which is obtained by processing a silicon board by using the MEMS technology, a piezo-resistance type acceleration sensor, or a heat detection type acceleration sensor, for example. In addition, the present disclosure is not limited to a configuration in which each of the three acceleration sensors 18x, 18y, and 18z is used for an axis as long as a sensor that can measure acceleration along three axes is provided. For example, a sensor device that can measure acceleration along three axes with one device (package) may also be used.

The control IC 19 as a processor is electrically coupled to the acceleration sensors 18x, 18y, and 18z via a wire (not shown). In addition, the control IC 19 is a micro controller unit (MCU), a memory including a non-volatile storage or an A/D converter is built into the control IC 19, and the control IC 19 controls each part of the sensor unit 100. The memory stores a program in which the order in which acceleration is measured and contents are prescribed, a program that digitizes detection data and incorporates the detection data into packet data, accompanying data, or the like. Note that, in the circuit board 15, a plurality of electric components other than those described above are installed although the electric components are not shown.

Configuration Example of Acceleration Sensor

Here, configurations of the acceleration sensors 18x, 18y, and 18z will be described with reference to FIGS. 8 and 9.

Figure 8:
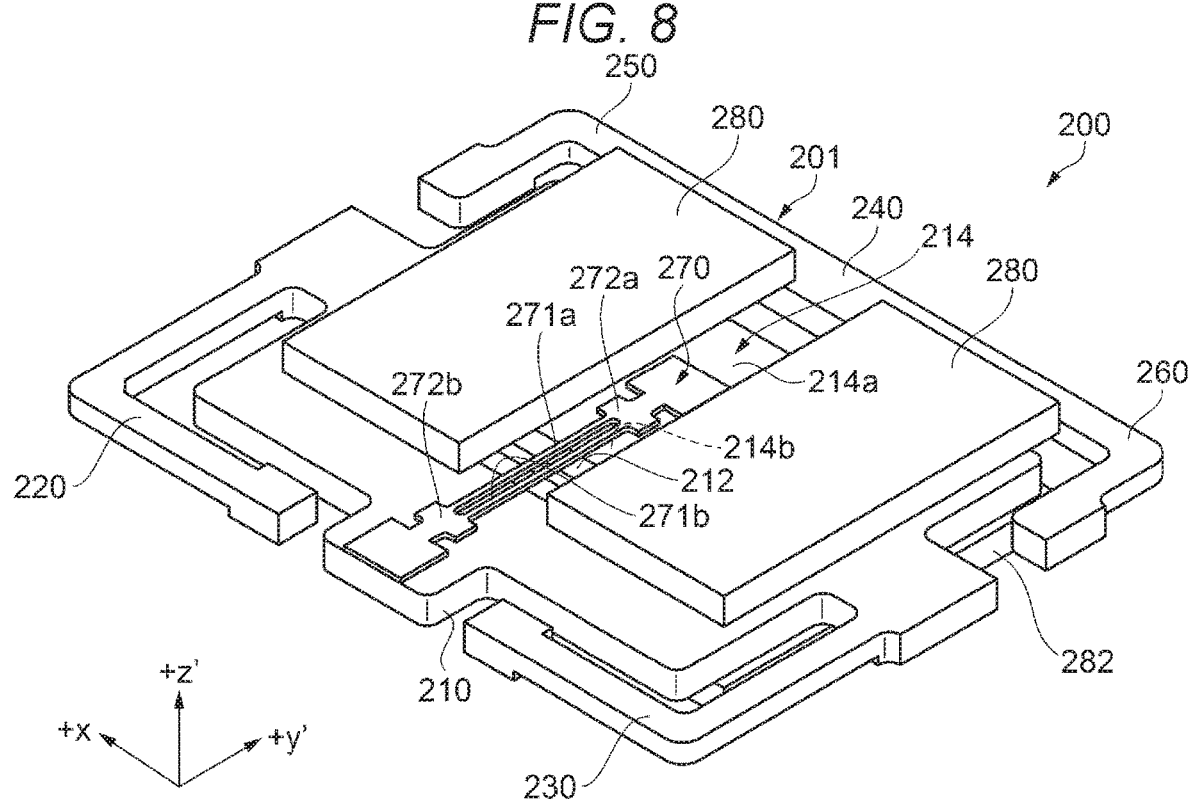
FIG. 8 is a perspective view for describing a schematic configuration of an acceleration sensor element.

FIG. 8 is a perspective view for describing a schematic configuration of an acceleration sensor element. FIG. 9 is a front view (sectional view) for describing a schematic configuration of an acceleration measuring device which uses the acceleration sensor element.

Note that, in FIG. 8, an x axis, a y' axis, and a z' axis are shown as three axes orthogonal to each other. Here, when an axis which is obtained by inclining a z axis by a rotation angle $\phi$ (preferably, $-5° \leq \phi \leq 15°$) with an x axis as a rotation axis such that a +z side is rotated in a −y direction along a y axis is the z' axis and an axis which is obtained by inclining the y axis by the rotation angle $\phi$ such that a +y side is rotated in a +z direction along the z axis is the y' axis in an orthogonal coordinate system consisting of the x axis as an electrical axis of a crystal, which is a piezoelectric material used as a base material of an acceleration sensor, the y axis as a mechanical axis, and the z axis as an optical axis, an example in which a so-called crystal z-plate (z'-plate), which is processed into a flat plate shape by being cut along a plane defined by the x axis and the y' axis and has a predetermined thickness t in a z' axis direction orthogonal to the plane, is used as a base material will be described. Note that, the z' axis is an axis along a direction in which the gravity acts in the acceleration sensors 18x, 18y, and 18z.

Configuration of Acceleration Sensor Element

First, a configuration of an acceleration sensor element 200 will be described with reference to FIG. 8. The acceleration sensor element 200 is provided with a board structure 201 including a base portion 210 or the like, an acceleration measuring element 270 that is coupled to the board structure 201 and measures a physical quantity, and mass portions 280 and 282.

The board structure 201 of the acceleration sensor element 200 is provided with the base portion 210, a movable portion 214 connected to the base portion 210 via a joint portion 212, a connection portion 240, a first supporter 220, a second supporter 230, a third supporter 250, and a fourth supporter 260, the first supporter 220, the second supporter 230, the third supporter 250, and the fourth supporter 260 being connected to the base portion 210. Here the third supporter 250 and the fourth supporter 260 are connected to each other on a side on which the connection portion 240 is disposed.

For the board structure 201, a crystal board of a crystal z-plate (z'-plate) that is cut from a crystal ore (which is piezoelectric material) at a predetermined angle as described above is used. Through patterning of the crystal board, those described above are integrally formed with each other as the board structure 201. In addition, for the patterning, for example, a photolithography technique and a wet etching technique can be used.

The base portion 210 is coupled to the movable portion 214 via the joint portion 212 and supports the movable portion 214. The base portion 210 is coupled to the movable portion 214 via the joint portion 212, is coupled to the connection portion 240 that is positioned on a side opposite to a side on which the joint portion 212 of the movable portion is positioned, is coupled to the first supporter 220 and the second supporter 230, and is coupled to the third supporter 250 and the fourth supporter 260 connected to each other on the connection portion 240 side.

The joint portion 212 is provided between the base portion 210 and the movable portion 214 and is coupled to the base portion 210 and the movable portion 214. The thickness (length in z' axis direction) of the joint portion 212 is smaller than the thickness of the base portion 210 and the thickness of the movable portion 214 and has a narrow shape in a sectional view as seen in an x axis direction. The joint portion 212 can be formed by forming a thin portion having a small thickness can be formed by performing so-called half etching on the board structure 201 including the joint portion 212, for example. The joint portion 212 functions as a rotation axis along the x axis direction and as a fulcrum (intermediate hinge) when the movable portion 214 is displaced (pivots) with respect to the base portion 210.

The movable portion 214 is coupled to the base portion 210 via the joint portion 212. The movable portion 214 has a plate-like shape and is provided with main surfaces 214a and 214b which face each other in the z' axis direction and are opposite to each other. The movable portion 214 can be displaced in a direction (z' axis direction) intersecting the main surfaces 214a and 214b with the joint portion 212 as a fulcrum (rotation axis) in accordance with acceleration, which is a physical quantity applied in the direction (z' axis direction) intersecting the main surfaces 214a and 214b.

The connection portion 240 extends in the X axis direction from the base portion 210 on a +x direction side on which the third supporter 250 (which will be described later) is provided such that the movable portion 214 is surrounded by the connection portion 240 and is coupled to the base portion 210 on a −x direction side on which the fourth supporter 260 (which will be described later) is provided.

The first supporter 220 and the second supporter 230 are provided to be symmetrical with respect to the acceleration measuring element 270. In addition, similarly, the third supporter 250 and the fourth supporter 260 are provided to be symmetrical with respect to the acceleration measuring element 270. In addition, the board structure 201 has a function of being supported on a fixation target portion (package 310 of acceleration measuring device 300 which will be described later with reference to FIG. 9) at the first supporter 220, the second supporter 230, the third supporter 250, and the fourth supporter 260.

The acceleration measuring element 270 is provided to be coupled to the base portion 210 and the movable portion 214 of the board structure 201. In other words, the acceleration measuring element 270 is provided to straddle the base portion 210 and the movable portion 214 of the board structure 201. The acceleration measuring element 270 is provided with vibration beams 271a and 271b as vibration portions, a first base portion 272a, and a second base portion 272b. Regarding the acceleration measuring element 270 of which the first base portion 272a and the second base portion 272b are coupled to the base portion 210, when the movable portion 214 is displaced in accordance with a physical quantity, a stress is generated on the vibration beams 271a and 271b and information about a physical quantity generated on the vibration beams 271a and 271b is changed, for example. In other words, the vibration frequency (resonant frequency) of the vibration beams 271a and 271b is changed. Note that, in the present embodiment, the acceleration measuring element 270 is a dual tuning fork element (dual tuning fork vibration element) provided with the two vibration beams 271a and 271b, the first base portion 272a, and the second base portion 272b. Note that, the vibration beams 271a and 271b as vibration portions may be vibration arms, vibration beams, or columnar beams.

As with the board structure 201, a crystal board of a crystal z-plate (z'-plate) that is cut from a crystal ore (which is piezoelectric material) at a predetermined angle as described above is used, as with the board structure 201 for the acceleration measuring element 270. The acceleration measuring element 270 is formed by performing patterning on the crystal board by using a photolithography technique and an etching technique. Accordingly, the vibration beams 271a and 271b, the first base portion 272a, and the second base portion 272b can be integrally formed with each other.

The material of the acceleration measuring element 270 is not limited to the above-described crystal board. For example, a piezoelectric material such as lithium tantalate ($LiTaO_3$), lithium tetraborate ($Li_2B_4O_7$), lithium niobate ($LiNbO_3$), lead zirconate titanate (PZT), zinc oxide (ZnO), aluminum nitride (AlN), or the like may also be used. In addition, a semiconductor material such as silicon that is provided with a film of a piezoelectric substance (piezoelectric material) such as zinc oxide (ZnO) and aluminum nitride (AlN) may also be used. However, it is preferable that the same material as that of the board structure 201 is used.

The acceleration measuring element 270 is provided with, for example, an extraction electrode (not shown) or an excitation electrode. However, the description thereof will be omitted.

The mass portions 280 and 282 are provided on the main surface 214a of the movable portion 214 and the main surface 214b, which is opposite to the main surface 214a and is a rear surface. More specifically, the mass portions 280 and 282 are provided on the main surface 214a and the main surface 214b via amass bonding material (not shown). Examples of the material of the mass portions 280 and 282 include metal such as copper (Cu) and gold (Au), for example.

In the present embodiment, the acceleration measuring element 270 is configured by using a dual tuning fork vibrator (dual tuning fork vibration element) of which a vibration portion is configured of two columnar beams (vibration beams 271a and 271b). However, the acceleration measuring element 270 may be configured of one columnar beam (single beam).

Configuration of Acceleration Detector

Next, a configuration of the acceleration measuring device 300 which uses the above-described acceleration sensor element 200 will be described with reference to FIG. 9. Note that, the acceleration measuring device 300 described herein can be used as the acceleration sensors 18x, 18y, and 18z of the sensor unit 100.

Figure 9:
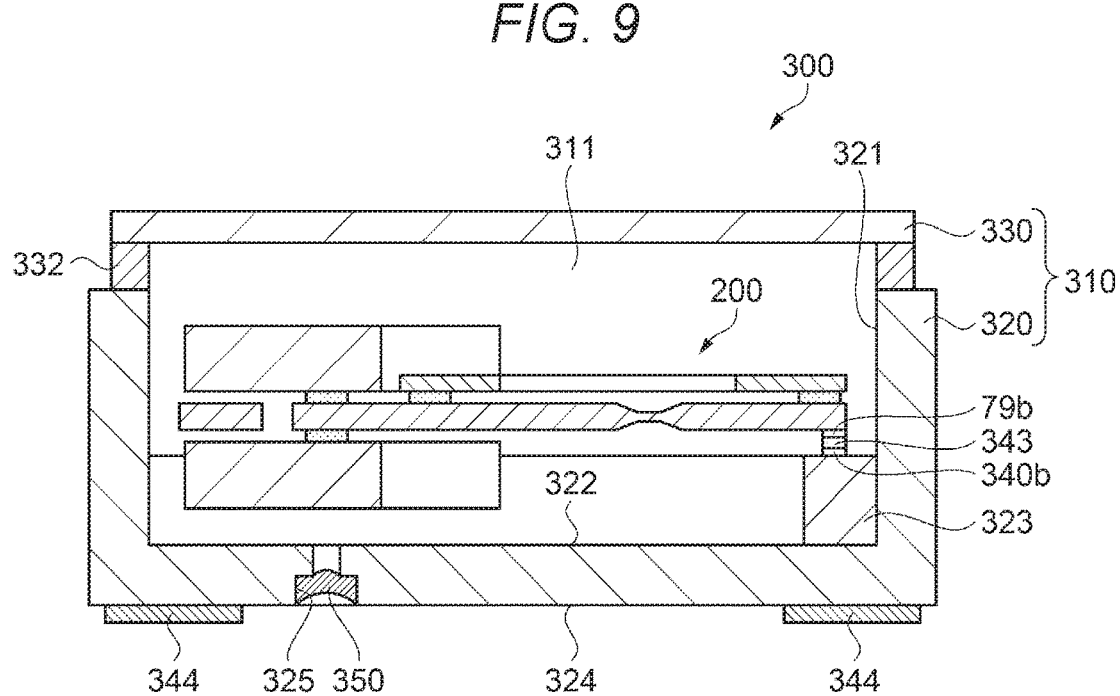
FIG. 9 is a sectional view for describing a schematic configuration of an acceleration measuring device which uses the acceleration sensor element.

As illustrated in FIG. 9, the above-described acceleration sensor element 200 is installed (accommodated) in the acceleration measuring device 300. The acceleration measuring device 300 is provided with the acceleration sensor element 200 and the package 310. In addition, the package 310 is provided with a package base 320 and a lid 330. In the acceleration measuring device 300, the acceleration sensor element 200 is accommodated (installed) in the package 310. More specifically, the acceleration sensor element 200 is accommodated (installed) in a space 311 which is provided with the package base 320 and the lid 330 coupled to each other.

The package base 320 is provided with a recess 321 and the acceleration sensor element 200 is provided in the recess 321. The shape of the package base 320 is not particularly limited as long as the acceleration sensor element 200 can be provided in the recess 321. For the package base 320 in the present embodiment, for example, a ceramic is used. However, the present disclosure is not limited thereto and a material such as a crystal, glass, silicon, or the like can be used.

The package base 320 is provided with a stepped portion 323 that protrudes toward the lid 330 side from an inner bottom surface (bottom surface inside recess) 322 of the package base 320. The stepped portion 323 is provided along an inner wall of the recess 321, for example. The stepped portion 323 is provided with a plurality of internal terminals 340b.

The internal terminals 340b are provided to face fixation portion coupling terminals 79b, which are provided for fixation portions of the first supporter 220, the second supporter 230, the third supporter 250, and the fourth supporter 260 of the acceleration sensor element 200 (provided to overlap fixation portion coupling terminals 79b in plan view). The internal terminals 340b are electrically coupled to the fixation portion coupling terminals 79b via a silicon resin-based conductive adhesive 343 including a conductive material such as a metal filler. As described above, the acceleration sensor element 200 is mounted on the package base 320 and is accommodated in the package 310.

An outer bottom surface 324 (surface opposite to inner bottom surface 322) of the package base 320 is provided with external terminals 344 that is used when the package base 320 is mounted on an external member. The external terminals 344 are electrically coupled to the internal terminals 340b via an internal wire (not shown).

Each of the internal terminals 340b and the external terminals 344 consists of metal layers obtained by stacking a film of nickel (Ni) or gold (Au) on a metallized layer of tungsten (W) or the like through metal plating.

A bottom portion of the recess 321 of the package base 320 is provided with a sealer 350 that seals the internal space (cavity) of the package 310. The sealer 350 is provided in a through-hole 325 formed in the package base 320. The through-hole 325 penetrates from the outer bottom surface 324 to the inner bottom surface 322. In an example shown in FIG. 9, the through-hole 325 has a stepped shape of which the hole diameter on the outer bottom surface 324 side is larger than the hole diameter on the inner bottom surface 322 side. The sealer 350 is provided by disposing a sealing member formed of an alloy of gold (Au) and germanium (Ge), solder, or the like in the through-hole 325 and solidifying the sealing member after heating and melting the sealing member. The sealer 350 is provided in order to air-tightly seal the internal space of the package 310.

The lid 330 is provided to cover the recess 321 of the package base 320. The shape of the lid 330 is, for example, a plate-like shape. For the lid 330, for example, the same material as that of the package base 320, an alloy of iron (Fe) and nickel (Ni), and metal such as stainless steel can be used. The lid 330 is bonded to the package base 320 via a lid bonding member 332. As the lid bonding member 332, for example, a seam ring, low melting point glass, an inorganic adhesive, or the like can be used.

It is possible to air-tightly seal the internal space of the package 310 by providing the sealer 350 obtained by disposing the sealing member in the through-hole 325 in a state where the pressure in the package 310 is decreased after the lid 330 is bonded to the package base 320 (state where degree of vacuum is high), heating and melting the sealing member, and solidifying the sealing member. The internal space of the package 310 may be filled with inert gas such as nitrogen, helium, and argon.

When a drive signal is applied to the excitation electrode of the acceleration sensor element 200 in the acceleration measuring device 300 via the external terminals 344, the internal terminals 340b, and the fixation portion coupling terminals 79b, the vibration beams 271a and 271b of the acceleration sensor element 200 vibrate (resonate) at a predetermined frequency. In addition, the acceleration measuring device 300 can output the resonant frequency of the acceleration sensor element 200, which changes in accordance with applied acceleration, as an output signal.

According to the above-described sensor unit 100, a speed at which heat generated in the control IC 19 installed in the first region AL1 of the circuit board 15 is transmitted is decreased due to the coupling region AL3 having the third sectional area and thus the heat is less likely to be transmitted to the acceleration sensors 18x, 18y, and 18z installed in the second region AL2 of the circuit board 15. Specifically, since the constriction portions 33 and 34 are provided, the third sectional area of the coupling region AL3 is smaller than the first sectional area of the first region AL1 in which the control IC 19 is installed and the second sectional area of the second region AL2 in which the acceleration sensors 18x, 18y, and 18z are installed. Therefore, a speed at which heat generated in the control IC 19 installed in the first region AL1 is transmitted in the coupling region AL3 can be decreased and thus the heat generated in the control IC 19 is less likely to be transmitted to the acceleration sensors 18x, 18y, and 18z installed in the second region AL2. Accordingly, it is possible to realize the sensor unit 100 in which a decrease in detection accuracy, which occurs when the heat generated in the control IC 19 is transmitted to the acceleration sensors 18x, 18y, and 18z, is suppressed.

Second Embodiment

Next, a sensor unit 100a according to a second embodiment of the present disclosure will be described.

Figure 10:
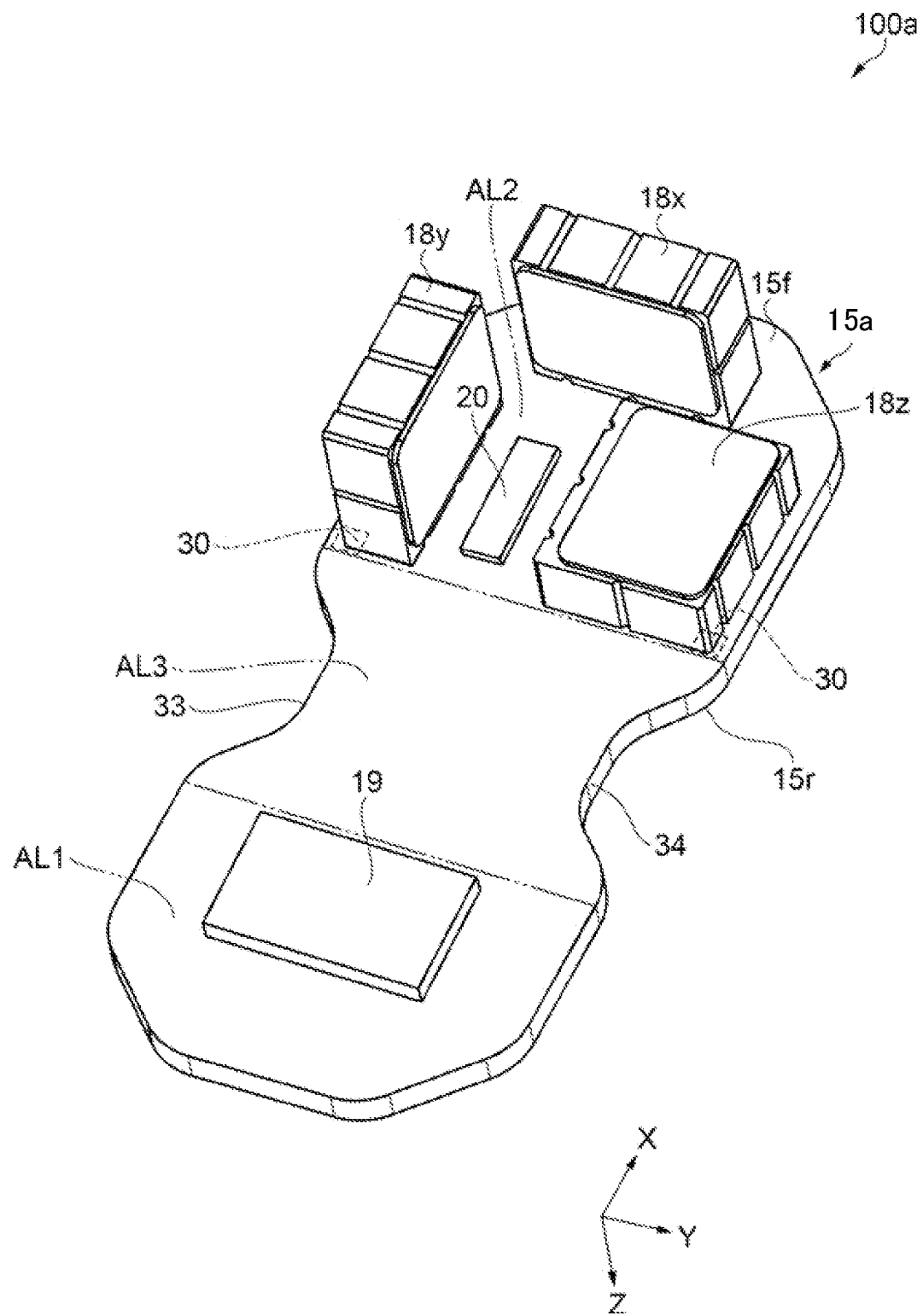
FIG. 10 is an external appearance perspective view illustrating a configuration of a board (circuit board) of a sensor unit according to a second embodiment of the disclosure.

FIG. 10 is an external appearance perspective view illustrating a configuration of a board (circuit board) of a sensor unit according to the second embodiment of the disclosure.

A circuit board 15a of the sensor unit 100a according to the present embodiment is the same as the circuit board 15 of the sensor unit 100 according to the first embodiment except for the configuration of the circuit board 15a. Note that, the following description about the circuit board 15a of the sensor unit 100a in the second embodiment will be made focusing on a difference between the first embodiment and the second embodiment and description about the common features therebetween will be omitted. In addition, the same components as in the first embodiment are given the same reference numerals in FIG. 10.

As illustrated in FIG. 10, the three acceleration sensors 18x, 18y, and 18z each of which can measure acceleration in one axis direction and a thermosensitive element 20 are installed on a first surface in the second region AL2 of the circuit board 15a of the sensor unit 100a according to the present embodiment. Furthermore, the control IC 19 is installed on a first surface in the first region AL1 of the circuit board 15a and a plug-type (male) connecter (not shown) is installed on a second surface which is opposite to the first surface of the first region AL1 of the circuit board 15a.

The thermosensitive element 20 is disposed on the first surface of the circuit board 15a to be close to the three acceleration sensors 18x, 18y, and 18z and detects heat transmitted to the acceleration sensors 18x, 18y, and 18z. Thereafter, in the control IC 19, temperature correction is performed with respect to output characteristics of the acceleration sensors 18x, 18y, and 18z based on the result of temperature measurement. Therefore, it is possible to detect heat transmitted to the acceleration sensors 18x, 18y, and 18z with the thermosensitive element 20 and to suppress a decrease in detection accuracy of the sensor unit 100a which is caused by influence of heat.

Note that, the thermosensitive element 20 is, for example, a thermistor or a diode and may be any thermosensitive device that can measure a temperature.

According to the above-described configuration, the sensor unit 100a provided with the circuit board 15a can suppress the influence of heat transmitted to the acceleration sensors 18x, 18y, and 18z and can have a high detection accuracy.

According to the second embodiment as well, it is possible to achieve the same effect as that of the first embodiment.

Third Embodiment

Next, a sensor unit 100b according to a third embodiment of the present disclosure will be described.

Figure 11:
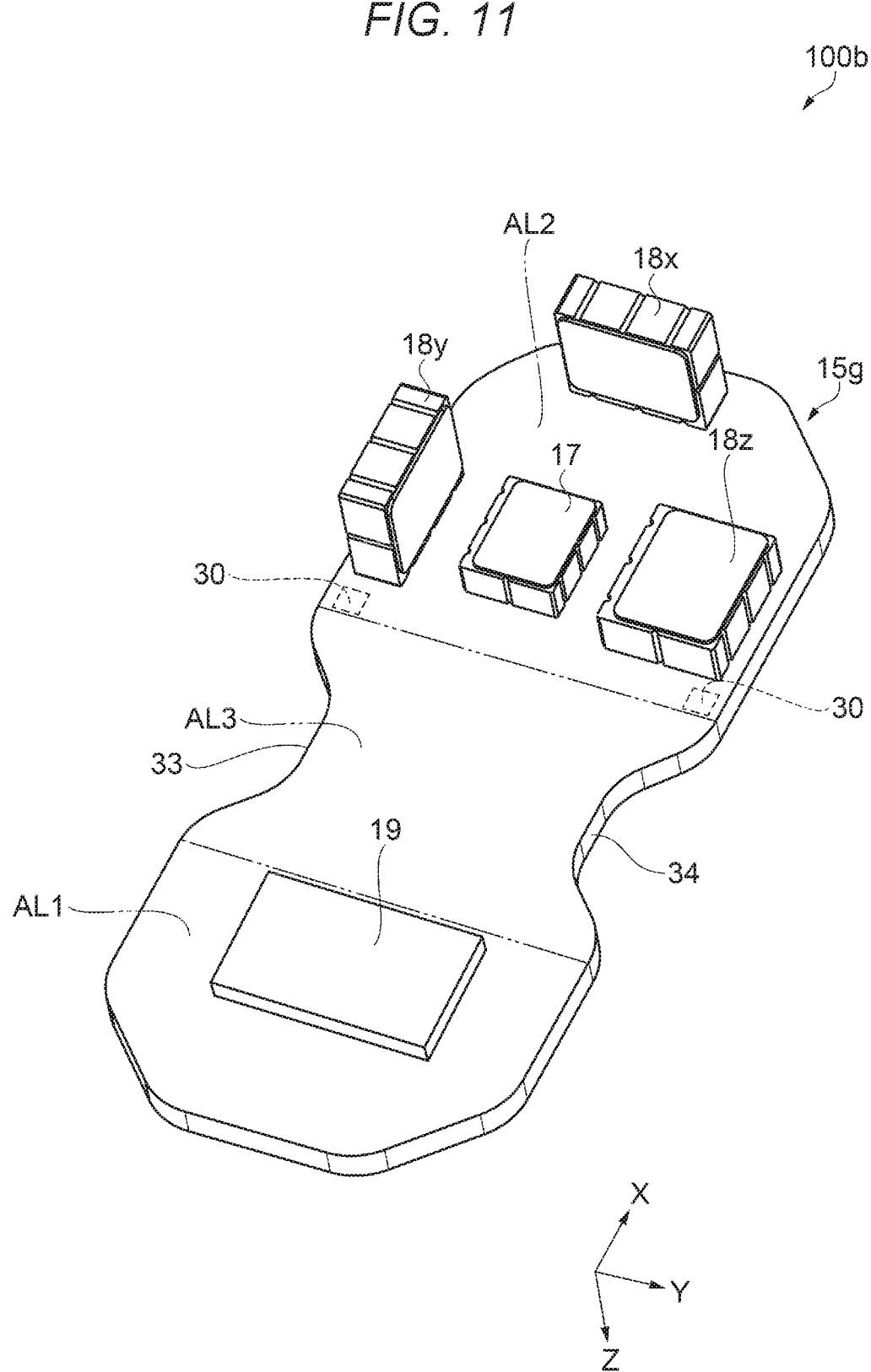
FIG. 11 is an external appearance perspective view illustrating a configuration of a board (circuit board) of a sensor unit according to a third embodiment of the disclosure.

FIG. 11 is an external appearance perspective view illustrating a configuration of a board (circuit board) of a sensor unit according to the third embodiment of the disclosure.

A circuit board 15g of the sensor unit 100b according to the present embodiment is the same as the circuit board 15 of the sensor unit 100 according to the first embodiment except for the configuration of the circuit board 15g. Note that, the following description about the circuit board 15g of the sensor unit 100b in the third embodiment will be made focusing on a difference between the first embodiment and the third embodiment and description about the common features therebetween will be omitted. In addition, the same components as in the first embodiment are given the same reference numerals in FIG. 11.

As illustrated in FIG. 11, as physical quantity sensors, the three acceleration sensors 18x, 18y, and 18z each of which can measure acceleration in one axis direction and an angular velocity sensor 17 that can measure angular velocity in three axis directions are installed on a first surface of the second region AL2 of the circuit board 15g of the sensor unit 100b according to the present embodiment. The angular velocity sensor 17 can measure acceleration in three directions (three axes) along the X axis, the Y axis, and Z axis with one device and a vibration gyro sensor, which is obtained by processing a silicon board by using the MEMS technology, is used as the angular velocity sensor 17 in order to measure angular velocity from the Coriolis force applied to a vibrating object. Furthermore, the control IC 19 is mounted on a first surface of the first region AL1 of the circuit board 15g and a plug-type (male) connecter (not shown) is installed on a second surface which is opposite to the first surface of the first region AL1 of the circuit board 15g.

According to the above-described configuration, the sensor unit 100b provided with the circuit board 15g can be used as an inertial measurement unit (IMU) which measures the posture or the behavior (inertia momentum) of a moving object (mounting target device) such as an automobile, an agricultural machine, a construction machine, a robot, and a drone. In addition, the sensor unit 100b which uses the circuit board 15g functions as a so-called six-axis motion sensor which is provided with the acceleration sensors 18x, 18y, and 18z for three axes and the angular velocity sensor 17 for three axes, as the physical quantity sensors.

Note that, at least any of the acceleration sensors 18x, 18y, and 18z and the angular velocity sensor 17 is installed in the sensor unit 100b according to the present embodiment as the physical quantity sensor and thus the sensor unit 100b can measure at least any of acceleration and angular velocity.

According to the third embodiment as well, it is possible to achieve the same effect as that of the first embodiment.

Fourth Embodiment

Next, a sensor unit 100c according to a fourth embodiment of the present disclosure will be described.

Figure 12:
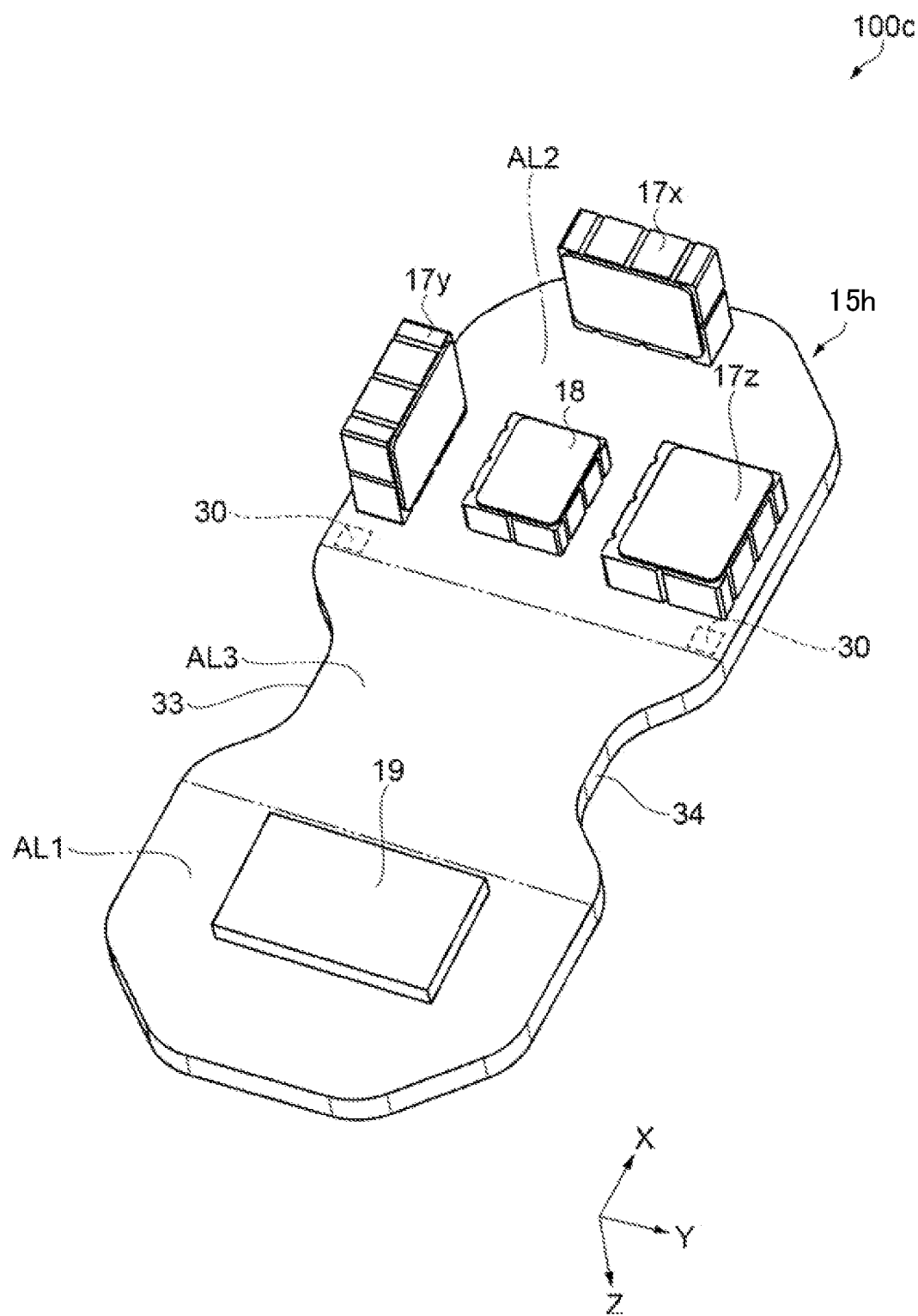
FIG. 12 is an external appearance perspective view illustrating a configuration of a board (circuit board) of a sensor unit according to a fourth embodiment of the disclosure.

FIG. 12 is an external appearance perspective view illustrating a configuration of a board (circuit board) of a sensor unit according to the fourth embodiment of the disclosure.

A circuit board 15h of the sensor unit 100c according to the present embodiment is the same as the circuit board 15 of the sensor unit 100 according to the first embodiment except for the configuration of the circuit board 15h. Note that, the following description about the circuit board 15h of the sensor unit 100c in the fourth embodiment will be made focusing on a difference between the first embodiment and the fourth embodiment and description about the common features therebetween will be omitted. In addition, the same components as in the first embodiment are given the same reference numerals in FIG. 12.

As illustrated in FIG. 12, as physical quantity sensors, three angular velocity sensors 17x, 17y, and 17z each of which can measure angular velocity in one axis direction and an acceleration sensor 18 are installed on a first surface of the second region AL2 of the circuit board 15h of the sensor unit 100c according to the present embodiment. Furthermore, the control IC 19 is installed on a first surface in the first region AL1 of the circuit board 15h and a plug-type (male) connecter (not shown) is installed on a second surface which is opposite to the first surface of the first region AL1 of the circuit board 15h.

Each of the angular velocity sensor 17x, 17y, and 17z is a gyro sensor that measures angular velocity along one axis. Preferably, a vibration gyro sensor which uses a crystal as a vibrator and measures angular velocity from the Coriolis force applied to a vibrating object is used. Note that, the gyro sensor is not limited to the vibration gyro sensor as long as a sensor that can measure angular velocity is provided. For example, a sensor in which a ceramic or silicon is used as a vibrator may also be used.

As the acceleration sensor 18, for example, a capacitance type acceleration sensor, which can measure acceleration in three directions (three axes) along the X axis, the Y axis, and Z axis with one device and which is obtained by processing a silicon board by using the MEMS technology, is used. Note that, the acceleration sensor is not limited to such a sensor as long as a sensor that can measure acceleration is provided. For example, a piezo-resistance type acceleration sensor or a heat detection type acceleration sensor may also be used. Alternatively, a configuration, in which one acceleration sensor is provided for each axis as with the above-described angular velocity sensors, may also be adopted.

According to the above-described configuration, the sensor unit 100c provided with the circuit board 15h can be used as an inertial measurement unit (IMU) which measures the posture or the behavior (inertia momentum) of a moving object (mounting target device) such as an automobile, an agricultural machine, a construction machine, a robot, and a drone. In addition, the sensor unit 100c which uses the circuit board 15h functions as a so-called six-axis motion sensor which is provided with the acceleration sensor 18 for three axes and the angular velocity sensors 17x, 17y, and 17z for three axes, as the physical quantity sensors.

Note that, at least any of the acceleration sensor 18 and the angular velocity sensors 17x, 17y, and 17z is installed in the sensor unit 100c according to the present embodiment as the physical quantity sensor and thus the sensor unit 100c can measure at least any of acceleration and angular velocity.

According to the fourth embodiment as well, it is possible to achieve the same effect as that of the first embodiment.

Structural Health Monitoring

Fifth Embodiment

Next, a structure health monitoring (SHM) 500 according to a fifth embodiment of the present disclosure will be described.

Figure 13:
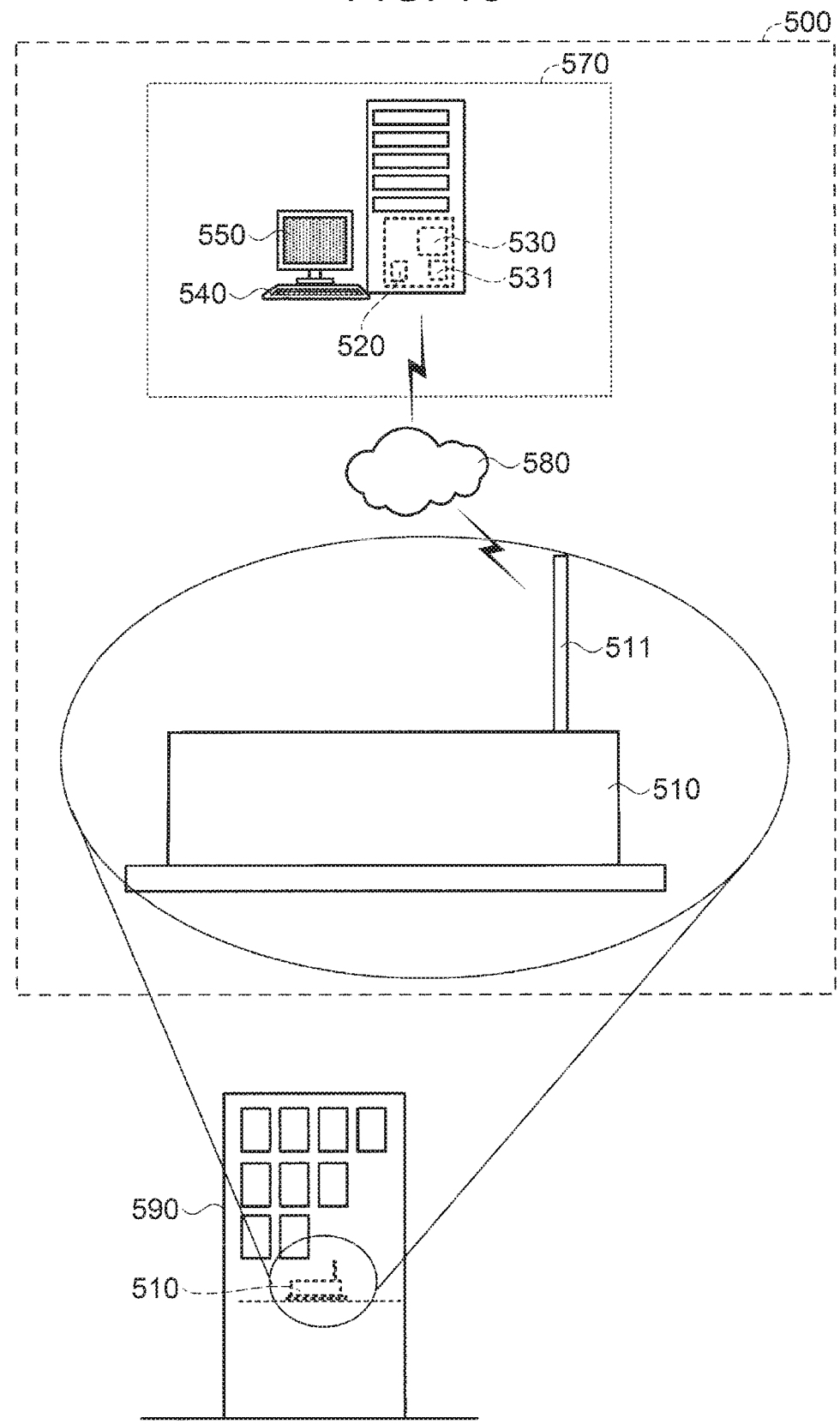
FIG. 13 is a configuration view of a structural health monitoring according to a fifth embodiment of the disclosure.

FIG. 13 is a configuration view of a structural health monitoring according to the fifth embodiment of the disclosure.

The structural health monitoring 500 includes a sensor unit 510 that has the same structure as the sensor unit 100 (100a, 100b, and 100c) in the embodiments and that is attached to a structure 590, which is a monitoring target. The sensor unit 510 includes a transmitter 511 that transmits a detection signal. The transmitter 511 may be realized as a communication module or an antenna separated from the sensor unit 510.

The sensor unit 510 is connected to a monitoring computer 570 via a wireless or wired communication network 580. The monitoring computer 570 includes a receiver 520 that is connected to the sensor unit 510 via the communication network 580 and a calculator 530 that calculates the inclination angle of the structure 590 based on a signal output from the receiver 520.

In the present embodiment, the calculator 530 is realized with an application specific integrated circuit (ASIC) or a field programmable gate array (FPGA) installed in the monitoring computer 570. The calculator 530 may be a processor such as a central processing unit (CPU) and the processor may perform arithmetic processing of a program stored in an IC memory 531 such that the calculator 530 is realized in the form of software. The monitoring computer 570 receives various operation inputs of an operator through a keyboard 540 and can display the result of the arithmetic processing on a touch panel 550.

According to the structural health monitoring 500 in the present embodiment, inclination of the structure 590 is monitored by using the sensor units 100, 100a, 100b, and 100c in the present embodiment. Therefore, it is possible to use high-accuracy acceleration measurement, which is the effect of the sensor units 100, 100a, 100b, and 100c, and it is possible to measure inclination of the structure 590, which is the monitoring target, at high accuracy. Therefore, it is possible to improve monitoring quality for the structure 590.

Hereinafter, contents derived from the above-described embodiment will be described as aspects.

According to an aspect, there is provided a sensor unit including a physical quantity sensor, a processor electrically coupled to the physical quantity sensor, a board on which the physical quantity sensor and the processor are installed, and a container accommodating the board. The physical quantity sensor and the processor are disposed on the board such that the physical quantity sensor and the processor do not overlap each other in a plan view.

In this case, since the physical quantity sensor and the processor generating heat are disposed not to overlap each other, heat generated in the processor is less likely to be transmitted to the physical quantity sensor. Therefore, a detection signal output from the physical quantity sensor is less likely to fluctuate due to the heat generated in the processor and it is possible to suppress a decrease in detection accuracy of the sensor unit.

In the sensor unit, the board may be provided with a first region in which the processor is installed and a second region in which the physical quantity sensor is installed.

In this case, since the processor is installed in the first region of the board and the physical quantity sensor is installed in the second region of the board, the processor and the physical quantity sensor can be separated from each other such that heat generated in the processor becomes less likely to be transmitted to the physical quantity sensor. Therefore, it is possible to suppress a decrease in detection accuracy of the sensor unit which is caused by the heat generated in the processor.

The sensor unit may further include a thermosensitive element installed in the second region.

In this case, since the thermosensitive element is installed in the second region of the board in which the physical quantity sensor is installed, it is possible to detect heat transmitted to the physical quantity sensor with the thermosensitive element. Therefore, it is possible to suppress a decrease in detection accuracy of the sensor unit which is caused by influence of heat.

In the sensor unit, the thermosensitive element may be installed on a surface in the second region of the board on which the physical quantity sensor is installed.

In this case, since the thermosensitive element is installed on a surface of the board on which the physical quantity sensor of the board is installed, it is possible to dispose the thermosensitive element to be closer to the physical quantity sensor and to more accurately detect heat transmitted to the physical quantity sensor. Therefore, it is possible to further suppress a decrease in detection accuracy of the sensor unit which is caused by influence of heat.

In the sensor unit, the thermosensitive element may be a thermistor or a diode.

In this case, since the thermosensitive element is a thermistor or a diode, the configuration of the thermosensitive element is simple.

In the sensor unit, the board may be provided with a coupling region that is disposed between the first region and the second region and has a third sectional area that is smaller than a first sectional area of the first region and a second sectional area of the second region in a sectional view as seen in a direction in which the first region and the second region are arranged.

In this case, since the coupling region that has the third sectional area that is smaller than the first sectional area of the first region and the second sectional area of the second region is provided between the first region and the second region of the board, a speed at which heat from the processor installed in the first region is transmitted in the coupling region, of which the sectional area is small, is decreased and thus the heat generated in the processor is less likely to be transmitted to the physical quantity sensor installed in the second region. Therefore, it is possible to further suppress a decrease in detection accuracy of the sensor unit which is caused by the heat generated in the processor.

In the sensor unit, the coupling region may be a constriction portion at which an outer edge of the board extending in a first direction, in which the first region and the second region are arranged, is constricted, as seen in a plan view.

In this case, since the coupling region has a so-called narrow shape in which the outer edge of the board is constricted, a speed at which heat is transmitted in the coupling region is decreased and thus the heat generated in the processor is less likely to be transmitted to the physical quantity sensor installed in the second region. Therefore, it is possible to further suppress a decrease in detection accuracy of the sensor unit which is caused by the heat generated in the processor.

In the sensor unit, the constriction portion may be provided on each of opposite sides of the board in a second direction orthogonal to the first direction, as seen in a plan view.

In this case, since the constriction portion is provided on each of the opposite sides of the board in the second direction, the coupling region can be made narrower. Therefore, a speed at which heat is transmitted in the coupling region can decreased more and thus the heat generated in the processor is less likely to be transmitted to the physical quantity sensor installed in the second region.

In the sensor unit, the physical quantity sensor may measure at least any of acceleration and angular velocity.

In this case, it is possible to suppress influence of a heat generated in the processor and thus it is possible to measure at least any of acceleration and angular velocity at high measurement accuracy.

According to another aspect, there is provided a structural health monitoring including the above-described sensor unit, a receiver receiving a detection signal from the sensor unit attached to a structure, and a calculator calculating an inclination angle of the structure based on a signal output from the receiver.

In this case, it is possible to provide a structural health monitoring with which it is possible to suppress influence of heat generated in the processor, it is possible to calculate the inclination angle of the structure based on the detection signal from the sensor unit with a high detection accuracy, and thus it is possible to measure the inclination angle at high accuracy.

What is claimed is:

1. A sensor unit comprising:
a board;
a physical quantity sensor installed on the board;
a processor installed on the board not to overlap the physical quantity sensor in a plan view while being electrically coupled to the physical quantity sensor;
a thermosensitive element installed on the board; and
a container accommodating the board, wherein
the board is provided with:
  a first region in which the processor is installed; and
  a second region in which the physical quantity sensor is installed,
the thermosensitive element is installed in the second region, and
the board is provided with a coupling region that is disposed between the first region and the second region and has a (third) sectional area [S3] that is smaller than a (first) sectional area [S1] of the first region and a (second) sectional area [S2] of the second region in a sectional view as seen in a direction in which the first region and the second region are arranged.

2. The sensor unit according to claim 1, wherein
the thermosensitive element is installed on a surface in the second region on which the physical quantity sensor is installed.

3. The sensor unit according to claim 1, wherein
the coupling region is a constriction portion at which an outer edge of the board extending in a first direction, in which the first region and the second region are arranged, is constricted, as seen in a plan view.

4. The sensor unit according to claim 3, wherein
the constriction portion is provided on each of opposite sides of the board in a second direction orthogonal to the first direction, as seen in a plan view.

5. The sensor unit according to claim 3, further comprising:
a connecter installed in the first region of the board.

6. The sensor unit according to claim 5, wherein
the thermosensitive element is a thermistor or a diode.

7. The sensor unit according to claim 1, wherein
the physical quantity sensor measures at least any of acceleration and angular velocity.

8. A structural health monitoring comprising:
the sensor unit according to claim 7;
a receiver receiving a detection signal from the sensor unit attached to a structure; and
a calculator calculating an inclination angle of the structure based on a signal output from the receiver.

* * * * *